Figure 1:
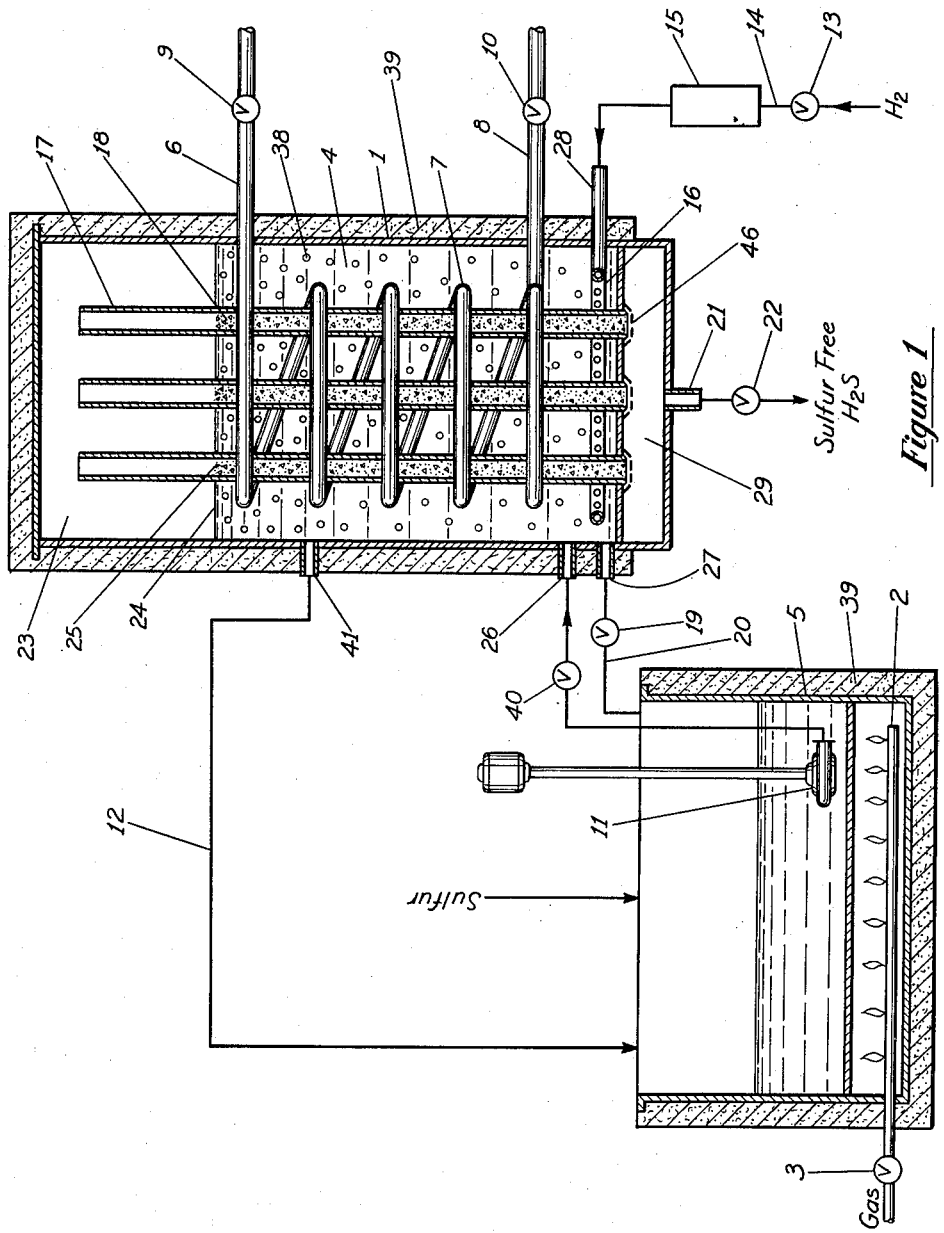

Dec. 9, 1958    A. H. MAUDE ET AL    2,863,725
PROCESS FOR MAKING SULFUR FREE HYDROGEN SULFIDE
Filed April 24, 1953    2 Sheets-Sheet 1

AYLMER H. MAUDE
DONALD E. MACFADYEN
INVENTORS

BY *Peter F. Casella*
AGENT

United States Patent Office 2,863,725
Patented Dec. 9, 1958

2,863,725

PROCESS FOR MAKING SULFUR FREE HYDROGEN SULFIDE

Aylmer H. Maude and Donald E. MacFadyen, Niagara Falls, N. Y., assignors to Hooker Chemical Corporation, Niagara Falls, N. Y., a corporation of New York Application April 24, 1953, Serial No. 350,864

3 Claims. (Cl. 23—181)

This invention relates to new and improved processes for the production of hydrogen sulfide and to apparatus therefor. More particularly, this invention provides a highly economical process for the production of hydrogen sulfide from elemental hydrogen and sulfur which contains substantially no free sulfur.

Many processes which employ hydrogen sulfide as a raw material necessitate a sulfur free feed stock. For example, if it is desired to compress hydrogen sulfide for the purpose of storing it in cylinders, a sulfur free product is required in order to avoid insurmountable difficulties caused by sulfur plugging up the compressors and valves employed. Another example is had in one of the commercial uses of hydrogen sulfide in the manufacture of sodium sulfide and sodium hydrogensulfide, or NaHS, commonly known as sodium sulfhydrate. In this process, if the hydrogen sulfide used to make these chemicals contains free sulfur, the products also will contain polysulfide sulfur and the products are darker in color. Sodium hydrogensulfide is used in the manufacture of mercaptans, such as alkyl mercaptans, which are used as commercial polymerization modifiers, and any free sulfur in the sodium hydrogensulfide oxidizes nearly quantitatively with the mercaptan to form dilauryl disulfide which is a highly undesirable impurity in dodecyl mercaptan to be used in polymerization reactions. Sulfur free hydrogen sulfide is also desirable in the dye, rayon and leather industries, as well as for many other purposes. In addition free sulfur in sodium hydrogensulfide may render the product more flammable. Thus commercial demands for a high purity uniform composition product of lower cost, have made it desirable to obtain an improved process for the production of sulfur free hydrogen sulfide.

Hydrogen sulfide is made principally as a byproduct from petroleum; however, this product contains a great deal of organic impurity which is undesirable and impractical to remove. It is also made by treating metal sulfides with steam or an acid; however, this product contains gaseous as well as solid impurities which, when using hydrogen sulfide as an intermediate chemical, contaminates the end products so that they cannot compete on a commercial scale with pure hydrogen sulfide.

It is known that if hydrogen is bubbled through molten sulfur at 250 to 300 degrees centigrade under a pressure of five to ten atmospheres, hydrogen sulfide will be formed but the reaction rate is extremely slow, and since the reaction mixture is both toxic and explosive in air, the use of elevated pressures makes this process undesirable for commercial installations. Attempts at improving this type process have been made by bubbling hydrogen through molten sulfur and passing the mixture at atmospheric pressure over a large contact surface area and the processes resulting will also produce hydrogen sulfide, but the processes are not adaptable for commercial manufacture and moreover, are not capable of economically producting sulfur free hydrogen sulfide.

In U. S. Patent 2,214,859, it was found that by using a catalytic material of the oxide or sulfide of cobalt, nickel, or molybdenum deposited on a carrier, vaporizing the sulfur extraneous to the catalyst using an excess of sulfur over hydrogen, and operating at temperatures between 500 and 800 degrees centigrade, a high yield of hydrogen sulfide with a high rate of production could be obtained. Although the process of this patent has been extensively used on a large commercial scale for the manufacture of high purity hydrogen sulfide, it has been found that this process has certain undesirable traits. The catalyst chamber is disclosed as being maintained near the upper limit of the 500 to 800 degrees centigrade temperature range defined in the patent, thus compelling the use of ceramic materials of construction. The heat of reaction could not be utilized economically because the gases are too corrosive at these high operating temperatures to be used in metallic heat transfer equipment which would be required for economic operation. Also, at these high temperatures and when operating with an excess of sulfur in accordance with the patent disclosure, the catalyst eroded away excessively at the space velocities and temperature conditions which must be used in the commercial process so that the catalyst bed clogged with dust causing channeling of the gases and necessitating frequent replacement of the bed, thus increasing the operating costs. Because it was necessary to operate under conditions which required a large excess of sulfur, a special condenser had to be used to condense out these excesses of free sulfur from the hydrogen sulfide gas as it left the catalyst chamber. In addition the cooled product gases, even after leaving the special cooler and scrubbing in a packed tower with aqueous sodium hydrogensulfide, contain such a high amount of free sulfur that a filter had to be installed to reduce the free sulfur to a satisfactorily low amount. These purification steps, of course, add to the cost of the product, making the over-all process less economical.

In fact none of the known operating processes for the production of hydrogen sulfide from elemental hydrogen and sulfur have been able to consistently produce a sulfur free product directly from the catalyst chamber, and all require additional expensive equipment for removing the free sulfur. Such processes have required increased installation, operation and maintenance costs because of the accessory equipment needed and also because the free sulfur present in the product prior to its removal clogs or freezes in the piping and equipment.

Therefore, it is an object of this invention to provide a process for the production of hydrogen sulfide by the catalytic reaction of hydrogen with sulfur which has substantially no free sulfur as it leaves the catalyst chamber. Another object is to provide a commercial process that will produce hydrogen sulfide of consistent uniform composition. A third object is to provide a commercial process which operates at sufficiently low temperatures to allow for utilizing the heat of reaction by employing metallic rather than ceramic materials of construction in the catalyst chamber. A fourth object is to provide a more active catalyst which does not excessively erode away under the operating conditions employed in the catalyst bed. A fifth object is to provide a process for the commercial manufacture of sulfur free hydrogen sulfide which requires a minimum of maintenance, operating, and utility costs. Another object is to provide an apparatus in which the process of this invention may be satisfactorily carried out on a commercial scale.

These and other related objects are accomplished by the process of the present invention which comprises: introducing sulfur into a bath of molten sulfur; bubbling hydrogen into the molten sulfur; maintaining the top of said bath at a temperature such that the vaporous mixture emerging from the top of the bath into the vapor zone at the pressure employed contains hydrogen and sulfur in a ratio of more than two atoms of hydrogen per atom of sulfur; passing the vaporous mixture into a packed catalytic reaction zone, said catalytic reaction zone being separate from said bath; and continuously recovering substantially sulfur free hydrogen sulfide of uniform quality from the catalytic reaction zone at a high rate of production.

In accordance with this invention, to insure that uncombined sulfur does not contaminate the product and introduce other disadvantages, an excess of hydrogen over the theoretical required for the reaction must be used. If an excess of sulfur is used instead of an excess of hydrogen, it will be impossible to obtain a sulfur free product directly from the catalyst bed. The amount of excess hydrogen to be used in the vaporous mixture will be determined by the operating pressure and the temperature of the molten sulfur bath. Since the excess of hydrogen which is employed will be associated with the hydrogen sulfide product leaving the catalyst bed we prefer to maintain the excess of hydrogen used below about ten mole percent of the theoretical required.

In addition, in order to obtain satisfactory results in accordance with this invention, the temperature at the top of the molten sulfur bath must be maintained so that the desired excess of hydrogen will prevail during the catalytic reaction, that is, so that the vaporous mixture emerging from the top of said bath into the vapor zone at the pressure employed contains hydrogen and sulfur in the ratio of more than two atoms of hydrogen per atom of sulfur. We have found that when operating such that the gases emerging from the molten bath are at about atmospheric pressure, the top of the molten bath must be maintained at a temperature less than 326 degrees centigrade in ratio of more than two atoms of hydrogen per atom of sulfur. A ten percent excess of hydrogen will be obtained at atmospheric pressure if the temperature maintained at the top of the molten bath is at about 323 degrees centigrade; a twenty percent excess of hydrogen will be obtained at atmospheric pressure if the top of the molten sulfur bath is maintained at about 320 degrees centigrade. We have found that the temperature to be employed in order to obtain the desired excess of hydrogen will vary with the pressure maintained in the vapor zone at the entrance to the catalyst bed, which pressure is due to the back pressure caused by the resistance to flow of the gases through the catalyst bed and also the pressure at which the gas is delivered. With each increase of one pound per square inch gauge pressure we have found that in order to obtain the desired ratio, the temperature maintained at the top of the molten sulfur should be increased approximately three to four centigrade degrees above the 326 degrees centigrade value which is necessary when operating at substantially atmospheric pressure.

In accordance with our invention we have also found it important to keep the molten sulfur bath physically separate from the catalyst. If the molten sulfur bath is allowed to contact the catalyst as in processes and apparatus arranged in accordance with disclosures of the prior art, such that sulfur condenses on the catalyst or the catalyst is actually submerged in the molten sulfur, the hydrogen sulfide gas emerging from the catalyst will contain free unreacted sulfur which therefore must be removed, in order to obtain a sulfur free product, by additional equipment and operations which increase the product cost.

The catalysts which may be employed in accordance with our invention in order to obtain a consistent product containing no free sulfur are varied and may be selected from metals of group 5, 6 or 8 such as molybdenum, cobalt, nickel, iron and vanadium, or, porous materials such as pumice, silica gel and alumina gel, crushed porous aluminum oxide refractory materials like "Alfrax" and "Aloxite," activated charcoal, and bauxite, or, mixtures of the foregoing metals deposited on the foregoing porous materials as carriers for the metals. We have found that the amount of excess hydrogen required to produce a sulfur free product will be dependent upon the catalyst selected, its temperature and the space velocity of the gas. Under the operating conditions of this invention the metals of group 5, 6 or 8 will be in the form of sulfides.

We prefer to use catalysts of either molybdenum sulfide deposited on activated bauxite or cobalt sulfide deposited on Alfrax because smaller hydrogen excesses are required and equilibria more rapidly established when using these catalysts than with others. Using these catalyst combinations, a hydrogen sulfide product may be continuously produced containing, as it comes from the catalyst chamber, substantially no free sulfur when using ten and twenty percent excesses of hydrogen respectively at a space velocity of about 412 liters of hydrogen (at room temperature and pressure) per liter of catalyst per hour and at about 330 degrees centigrade. When a catalyst consisting of a combination of molybdenum sulfide on a carrier of activated bauxite is used under the operating conditions and in the apparatus as described above, catalyst erosion may be greatly reduced, clogging and channeling of the catalyst may be eliminated and the life of the bed greatly extended from that of any other process for making consistently high quality hydrogen sulfide that we know of. From an over-all consideration of the process, we prefer to use this catalyst combination, which we believe has not been known or used for the production of hydrogen sulfide previous to our discovery and use in this invention.

The temperature of the catalyst is regulated by heat transfer to the sulfur bath through metallic walls, such as stainless steel, aluminum-clad iron, or alloys of aluminum which are chemically resistant to sulfur and hydrogen at these temperatures. The temperature of the catalyst may also be partially regulated, by using a large excess of hydrogen; however this would require much larger sizes of catalyst beds and other equipment as well as giving a more dilute hydrogen sulfide product.

The space velocity to be used is dependent on the catalyst. When using less active catalysts, lower space velocities are required to give a sulfur free product, whereas when a more active catalyst is used, much higher space velocities may be used without reducing the product quality.

Reference is made to the attached drawings which diagrammatically depict two preferred processes and apparatus of this invention but these are not to be construed as limiting except as defined by the claims.

Referring to Figure 1: The apparatus comprises: an insulated reactor 1 having a zone 4 for containing molten sulfur which is fed from an insulated heating tank 5 for melting and storing sulfur, which tank is equipped with heating means 2 shown as gaseous fuel which is controlled through valve 3 and pumping means shown as a submerged pump 11. The reactor 1 has a vapor zone 23 for conveying the vapors emerging from the molten sulfur, a catalytic reaction zone 18 for reacting the vapors from the vapor zone 23. The molten sulfur zone 4 and the vapor zone 23 are in physical contact at their interface 24 and the molten sulfur zone 4 is in heat transfer relationship with the catalytic reaction zone 18 through the metal walls of the tubes 17 containing the catalyst. The vapor zone 23 and the catalytic reaction zone 18 are in physical contact at their boundary or interface 25. The process will be more fully described below with reference to Figure 1, but it is pointed out herein that the molten sulfur zone 4 has an inlet 26 for introducing sulfur into the molten zone 4, an outlet 27 for removing the molten liquid, a gas inlet 28 near the bottom of the zone for bubbling the gas through the molten sulfur contained in zone 4, a gas flow meter 15 as means for controlling the amount of gas to be bubbled into the molten zone 4, water or steam coils 7 as means for controlling the temperature of the liquid in the molten zone 4, and a leveling overflow line as means for controlling the level of the liquid in the molten zone 4. The catalytic reaction zone 18 contains a catalyst for the reaction of the hydrogen with the vaporized sulfur, catalyst supporting means 46, and contains an outlet 21 for removing the gaseous reaction products therefrom. In Figure 1, a bubble of gas in the molten sulfur is shown by reference numeral 38 and the insulating materials for the insulated reactor 1 and the insulated heating tank 5 is shown by the reference numeral 39.

In order that the process and apparatus of this invention will be more fully understood the following description is given in connection with Figure 1.

Sulfur from a source of supply, not shown, is added to a large insulated heating tank 5. As heating means, gas burners 2 controlled by valve 3 are ignited to melt the sulfur and, when starting up, to heat it up to the desired operating temperature of the bath 4 which is to be in the insulated reactor 1. Other means of heating such as electrical resistance or superheated steam may be used also. The reactor 1 may be preheated by running steam from a source of supply not shown through line 6 coils 7 and line 8 and controlled by valves 9 and 10. When the molten sulfur has been raised to the desired temperature, the liquid is pumped by a submerged pump 11 through valve 40 and inlet 26 into the reactor 1 and filled up to a desired height controlled, for instance, by the elevation of overflow line 12 from outlet 41. Hydrogen, controlled by valve 13 from a source of supply not shown is conducted through pipe 14 and flow meter 15 by inlet 28 into perforated pipe 16 below the surface of the molten liquid in the reactor 1 where it bubbles up through the molten sulfur in zone 4. The mixture of sulfur vapor and hydrogen emerge out from the liquid sulfur along the interface 24, rises continuously to the top of the tubes 17 containing the catalyst, and down the inside of the tubes across the boundary interface 25 and into the catalyst bed 18. The metal tubes 17 extend above the catalyst zone 18 and the liquid zone 4 nearly to the top of the vapor zone 23; and thereby prevent any liquid sulfur in the molten bath 4 from spattering or surging over into the catalyst bed 18. Here in the catalytic reaction zone 18 the mixture reacts to form hydrogen sulfide and the heat of reaction is dissipated by heat exchange through the metal walls of the tubes containing the catalyst to the molten sulfur in the liquid zone 4. In this manner a catalyst bed temperature may be maintained. Auxiliary temperature control means may be obtained by injecting an excess of hydrogen into the vapor zone 23, or by cooling the sulfur bath by injecting steam or water into the coils 7 through lines 6 or 8. Instead of having coils 7 in the reactor 1, they may be placed in the insulated heating tank 5 and the temperature of the molten bath 4 may thereby be controlled by regulating the temperature of the feed entering the reactor 1 at the inlet 26. Since the gases react exothermally, by regulating the relative heights of the liquid-vapor interface 24 and the vapor catalyst interface 25 there may be a zone in the tubes immediately above the catalyst bed 18 where the gases will be hotter than when they emerged from the liquid sulfur 4. In this manner any sulfur mist entrained in the gaseous mixture may be vaporized before the mixture comes in physical contact with the catalyst. The gases travel down through the bed, pass through the catalyst support 46 into a collecting section 29 and exit from the reactor as a product comprising hydrogen sulfide, excess hydrogen, and containing substantially no free sulfur. This product is sent to a point of final deposition through outlet 21 and valve 22. The product, being practically constant in relative amounts of hydrogen and hydrogen sulfide, and being consistently free from unreacted sulfur, needs no further purification equipment to remove any unreacted sulfur.

After starting up, the molten sulfur tank 5 need not be operated at the temperature of the reactor, but is only used to melt the sulfur and pump the liquid into the bottom of the reactor 1. Therefore, after steady conditions have been established, there may be a difference of temperature between the top and the bottom of the sulfur bath 4 and in this manner the bath 4 may be used not only to absorb the heat of reaction but also to partially cool the reaction gases as they travel down through the catalyst bed 18 if the levels of the hydrogen inlet and catalyst bed are elevated above that depicted in Figure 1. Sulfur is pumped into the reactor 1 at the rate such that some of the molten bath 4 overflows through line 12 back into the tank 5, thereby using this hot liquid to melt the incoming solid cold sulfur. We find that after steady state conditions have been established no additional heat need be added by the heating means 2. We have found that the rate and temperature of sulfur fed to the reactor 1 may be used as a very good means for controlling the temperature of the molten bath 4. Notice that no preheating of the hydrogen is needed, so the only heat lost from the system is from radiation losses from the insulated equipment and from the heat contained in the reactor exit gases. Thus the process is substantially self-sustaining or there may be excess heat which may be removed by the cooling means provided.

When operating with our preferred catalyst combination of molybdenum sulfide on activated bauxite and using a ten percent excess of hydrogen, we find that a hydrogen sulfide product containing substantially no free sulfur can be consistently obtained by maintaining the catalyst bed at about 330 degrees centigrade. When operating with a combination of cobalt oxide or sulfide deposited on Alfrax and using a twenty percent excess of hydrogen, a similar product can be consistently produced containing substantially no free sulfur by maintaining the hottest portion of the catalyst bed at 375 degrees centigrade. Other catalysts may be used to obtain a sulfur free product with slight modifications in the operating conditions and the amount of excess hydrogen to be used. Under these preferred conditions the molybdenum sulfide on activated bauxite is superior to the cobalt sulfide on Alfrax catalyst.

By controlling the exit pressure of the hydrogen sulfide gases and the pressure of the hydrogen gas, the reactor may be maintained at any desired moderate pressure. We prefer to operate at atmospheric pressure for it is less hazardous. Other well-known means of pressure regulation such as safety valves in the vapor zone 23 or in the collecting section 29 or lines controlling the maximum liquid level of the sulfur bath 4 may also be used.

When it is desired to shut down the process, the hydrogen and product gases are stopped by closing valves 13 and 22 and the molten sulfur 4 may be emptied from the reactor 1 back into the heating tank 5 by opening valve 19 and draining through line 20. The gases in the reactor 1 may be purged by passing hydrogen or a chemically inert gas such as nitrogen or carbon dioxide through the reactor via line 14 into the reactor 1 and out through line 21. Other methods for starting up and shutting down may be used.

Since the temperatures used are below about 400 degrees centigrade the reactor 1, including the tubes 17 containing the catalyst and the heating tank 5 may be constructed of stainless steel, aluminum, aluminum alloys or iron clad with aluminum, for these metals are relatively noncorrosive to the chemicals at these temperatures.

Figure 2:
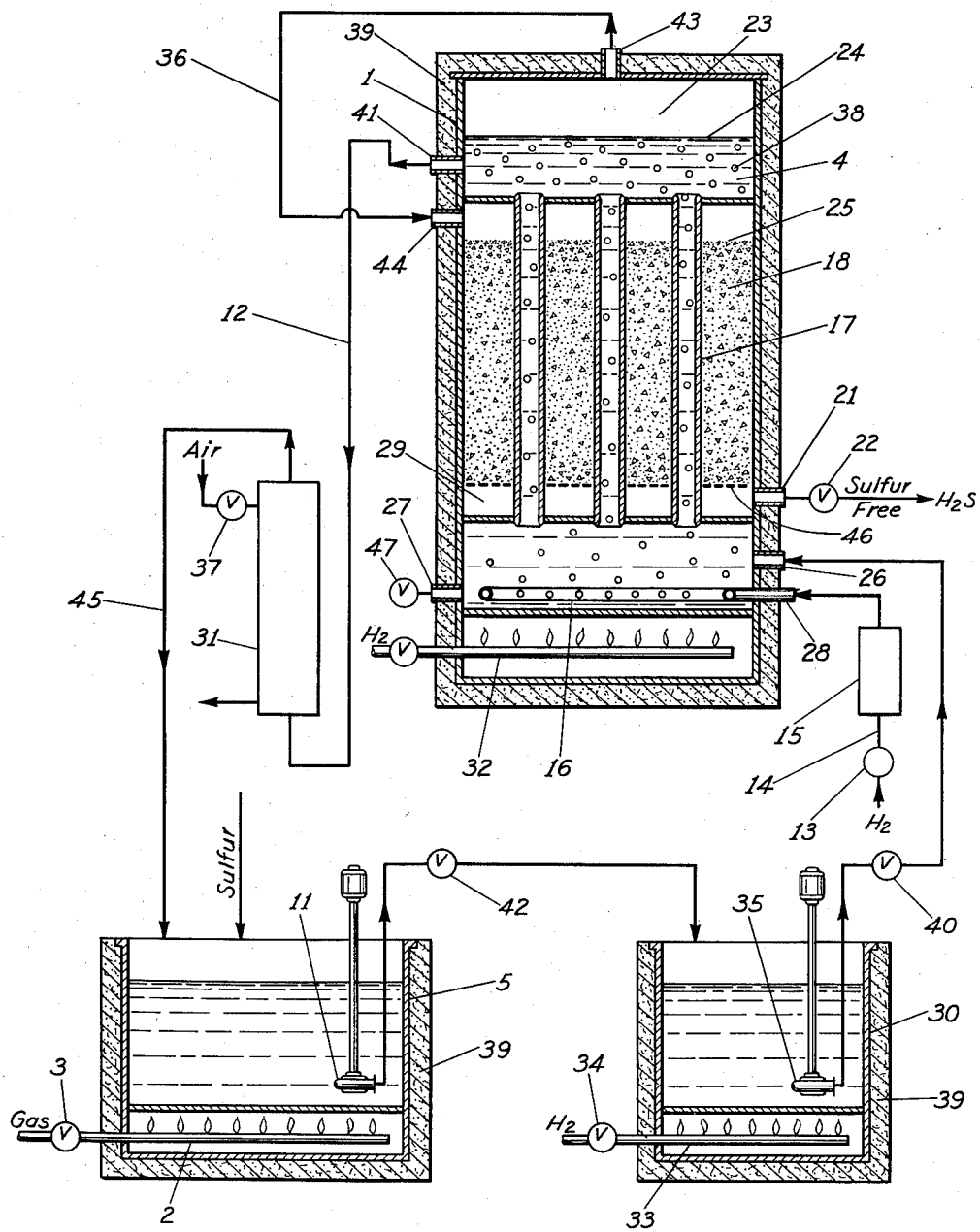

Referring to Figure 2, the apparatus comprises: an insulated reactor 1, an insulated sulfur melting tank 5, an insulated sulfur feed tank 30, and a sulfur cooler 31.

The reactor 1 has a zone 4 for containing molten sulfur which is fed from the sulfur feed tank 30, a vapor zone 23 for conveying the vapors emerging from the molten sulfur and a catalytic reaction zone 18 for reacting the vapors from the vapor zone 23. The molten sulfur zone 4 and the vapor zone are in physical contact at their interface 24 and the molten sulfur zone 4 is in heat transfer relationship with the catalytic reaction zone 18 through the metal walls of the tubes 17 surrounded by the catalyst. The vapor zone 23 and the catalytic reaction zone 18 are in physical contact at their boundary or interface 25. The process will be more fully described below with reference to Figure 2, but it is pointed out herein that the molten sulfur zone 4 has an inlet 26 for introducing sulfur into the molten zone 4, an outlet 27 controlled by valve 47 for removing the molten liquid, a gas inlet 28 near the bottom of the molten zone 4 for bubbling the hydrogen gas through the molten sulfur contained in zone 4, a gas flow meter 15 as means for controlling the amount of gas to be bubbled into the molten zone 4, heating means 32 for controlling the temperature of the liquid in the molten zone 4 and a leveling over flow line 12 connected to outlet 41 as means for controlling the level of the liquid in the molten zone 4. The catalytic reaction zone 18 contains a catalyst for the reaction of the hydrogen with the vaporized sulfur, catalyst supporting means 46, and contains an outlet 21 for removing the gaseous reaction products therefrom. In Figure 2, a bubble of gas in the molten sulfur is shown by reference numeral 38 and the insulating materials for the insulated reactor 1, the insulated heat tank 5 and the insulated sulfur feed tank 30 is shown by the reference numeral 39.

Sulfur from a source of supply not shown, is added to an insulated melting tank 5. As heating means, gas burners 2 controlled by valve 3 are ignited to melt the sulfur and, when starting up, may be used to heat up the sulfur to the desired operating temperature of the bath 4 which is to be in the insulated reactor 1. Other means of heating such as electrical resistance or super heated steam may also be used. The liquid sulfur is pumped from the sulfur melting tank 5 through valve 42 into the sulfur feed tank 30 by submerged pump 11, or an underflow line if the two tanks are positioned to do this. As heating means hydrogen burners 33 controlled by valve 34 are ignited to maintain the molten sulfur at the desired temperature. Other means for heating may be used also as in the melting tank 5 above. When the molten sulfur has been raised to the desired temperature, the liquid is pumped by submerged pump 35 through valve 40 and inlet 26 into the reactor 1 and fills up the reactor 1 to a desired height controlled, for instance, by the elevation of overflow line 12 from outlet 41. Hydrogen, controlled by valve 13 from a source of supply not shown is conducted through pipe 14 and flow meter 15 by inlet 28 into perforated pipe 16 below the surface of the molten liquid in the reactor 1 where it bubbles up through the molten sulfur in zone 4. The mixture of sulfur vapor and hydrogen emergent from the liquid sulfur along the interface 24, rises continuously into pipe 36 from outlet 43 where it is carried through inlet 44 and across the boundary interface 25 into the catalyst bed 18. Using apparatus of this design further insures that liquid sulfur from the molten bath is prevented from spattering or surging into the catalyst bed 18. Here in the catalytic zone 18 the vaporous mixture reacts to form hydrogen sulfide and the heat of reaction is dissipated by heat exchange through the metal walls of the tubes 17 to the molten sulfur in the liquid zone 4. In this manner, a catalyst bed temperature may be maintained. Auxiliary temperature control means may be obtained by injecting an excess of hydrogen into the vapor zone 23. Molten sulfur is pumped into the reactor 1 at such a rate that it overflows through outlet 41 and line 12 and passes through a sulfur cooler 31 where excess heat is removed and the temperature of the molten sulfur in zone 4 thereby further controlled. As means for cooling, air from a source of supply not shown controlled by valve 37 is passed in heat exchange relationship across the pipes containing the molten sulfur. Other means of cooling such as water or steam also may be used. The cooled sulfur is returned to the system through line 45, for instance, by way of the sulfur feed tank 30, or directly into the sulfur melting tank 5 and thereby be used to melt the incoming solid sulfur. Also some of the sulfur overflowing through outlet 41 and line 12 may flow directly into the sulfur melting tank 5 and thereby be used to melt the incoming solid sulfur.

The gases travel through the catalyst bed 18, pass through the catalyst support 46 into the collecting section 29 and exit from the reactor 1 through outlet 21 as a product comprising hydrogen sulfide, excess hydrogen, and containing substantially no free sulfur. This product, being practically constant in relative amounts of hydrogen and hydrogen sulfide, and being consistently free from unreacted sulfur, needs no further purification equipment to remove any unreacted sulfur and is sent to a point of final deposition through outlet 21 and valve 22.

After starting up, when steady state conditions have been established, if the overflowing sulfur from the reactor 1 is used to melt the incoming cold sulfur, the sulfur melting tank 5 needs very little or no outside heating means 2. Notice that in this process also, no preheating of the hydrogen is needed.

Where there is a steady source of molten sulfur, the sulfur melting tank 5 may be unnecessary and those streams which go into the melting tank 5 can be diverted to another point in the process, for instance the sulfur feed tank 30.

The catalyst may be introduced and removed from the catalytic reaction zone 18 by various means, for instance, a manhole or other inlet and outlet devices for handling granular solid materials may be used depending upon the particular process and apparatus to be employed.

Various other modifications may be made to the processes and apparatus without departing from the scope of this invention. The hydrogen may be bubbled through the molten sulfur in a container separate from the heat exchanging catalytic reaction zone, the molten sulfur in heat transfer relationship with the catalyst serving primarily as an heat absorbing medium. More specifically, the molten sulfur zone may comprise two sections in separated containers in communication with each other, one section of which contains molten sulfur in heat transfer relationship with the catalytic reaction zone, and the other section of which has an inlet below the surface of the liquid for bubbling the hydrogen through the molten sulfur contained in it. In this manner, for instance, molten sulfur would be passed continuously through the section of molten sulfur zone which is in heat transfer relationship with the catalytic reaction zone and then passed continuously into the section of the molten sulfur zone which has the inlet for bubbling the hydrogen through this molten sulfur. The vapors emergent from this section of the molten sulfur zone would be passed into the catalytic reaction zone, and any excess molten sulfur not to be vaporized would be removed from either the section of the molten sulfur zone which is in heat transfer relationship with the catalytic reaction zone or the section which contains the inlet for bubbling the hydrogen gas into the molten sulfur, and this excess molten sulfur would be returned to the system either with or without partial cooling, for instance by way of the sulfur melting tank. Also, where it is desired, the hydrogen may be preheated before being bubbled through the molten sulfur but we prefer to operate the process without this added modification. It is to be understood that the sulfur being introduced into the bath of molten sulfur in the reactor may be in either the solid or liquid form or both.

The following examples show a few of the preferred catalysts and operating conditions which may be obtained by using our improved process but we do not wish to be limited to them except as defined in the appended claims.

Into a vertical tube two inches in diameter were placed 673 cubic centimeters of catalyst consisting of molybdenum on activated bauxite. The catalyst was prepared by soaking commercially available activated bauxite pellets (4 to 6 mesh) in a solution containing 300 grams per liter of ammonium molybdate, and heating to drive off the moisture and ammonia. The catalyst was exceptionally hard and very free of dust, even after extended use, and analyzed 10.6 percent molybdenum. The tube was wound for electrical heating and provided for an internal thermocouple well and the catalyst bed thereby maintained at the desired temperature. A mixture of sulfur vapor and hydrogen composed of 10 mole percent excess of hydrogen was passed continuously through the catalyst bed maintained at a temperature of about 350 degrees centigrade at a space velocity of 412 liters of hydrogen (at room temperature and pressure) per liter of catalyst per hour. Under these conditions the molybdenum oxide is converted to molybdenum sulfide. The product stream of hydrogen sulfide and hydrogen was analyzed periodically for free sulfur. This run was continued for 300 hours with no free sulfur appearing either in the analyses or condensed in the connectors.

The run was repeated except that the catalyst was maintained at 325 degrees centigrade and the space velocity was doubled. Under these conditions the exit gas stream was found to contain 0.25 percent free sulfur. In another run no free sulfur was observed when using a catalyst of cobalt molybdate on absorbent aluminum oxide type pellets, a (hydrogen) space velocity of 412 times the bulk volume of the catalyst per hour, a catalyst temperature of 330 degrees centigrade, and a 16 percent excess of hydrogen.

Using a catalyst of cobalt oxide on Alfrax, two runs were made, one at 350 degrees centigrade and the other at 375 degrees centigrade, with a 20 percent excess of hydrogen and a space velocity of 412 times the bulk volume of the catalyst per hour. The tests analyzed consistently less than one percent free sulfur content.

Using an activated bauxite catalyst at about 382 degrees centigrade with a 30 percent excess of hydrogen and a space velocity of 206 times the bulk volume of the catalyst per hour, the hydrogen sulfide was found to contain consistently less than 1.7 percent free sulfur.

When combinations of carrier impregnated with metallic oxides or sulfides are used, they may be prepared by soaking the carrier in a solution containing a soluble salt of the metal, or metals to be used, until the carrier has taken up all it will hold, heating to drive off the moisture and finally igniting to convert the metal to the oxide or sulfide and drive off the remaining volatile materials. Alternatively, the activated carrier may be soaked in the molten salts of the metals to be used and then ignited.

It is to be understood that although the apparatus of this invention has been described with particular reference to the reaction of elemental hydrogen and sulfur to produce hydrogen sulfide, it may be employed for the vapor phase catalytic reaction of a gas with a volatile liquid to form a gaseous product.

Various modifications may be made within the scope and spirit of our invention without altering the sulfur free product to be obtained and we do not wish to be limited to the above disclosure except as defined in the appended claims.

We claim:

1. In a continuous process for making hydrogen sulfide by reacting elemental hydrogen with sulfur the steps comprising: introducing sulfur into a bath of molten sulfur; bubbling hydrogen into the molten sulfur bath, regulating the amount of hydrogen entering the sulfur bath and regulating the temperature at the top of said bath so that the vaporous mixture emerging from the top of the bath into the vapor zone contains hydrogen and sulfur in a ratio of at least ten percent more than two atoms of hydrogen per atom of sulfur; passing the vaporous mixture into a packed catalytic reaction zone containing a catalyst consisting of molybdenum sulfide deposited on a carrier of activated bauxite; maintaining the catalyst bed at about 330 degrees centigrade, and continuously recovering substantially sulfur free hydrogen sulfide of uniform quality directly from the catalytic reaction zone at a high rate of production.

2. The process of claim 1 wherein the temperature maintained at the top of the molten sulfur bath is below about 326 degrees centigrade at substantially atmospheric pressure with a negligible pressure drop through the catalyst bed.

3. The process of claim 1 wherein the temperature maintained at the top of the molten sulfur bath is below about 326 degrees centigrade plus between about 3 and 4 centigrade degrees for each pound per square inch gauge pressure maintained at the entrance to the catalyst zone.

References Cited in the file of this patent

UNITED STATES PATENTS

| | | |
|---|---|---|
| 1,309,623 | Henwood | July 15, 1919 |
| 1,700,578 | Bacon | Jan. 29, 1929 |
| 1,898,775 | Hechenbleikner | Feb. 21, 1933 |
| 2,214,859 | Maude | Sept. 17, 1940 |
| 2,474,066 | Priesman | June 21, 1949 |
| 2,503,013 | Watson | Apr. 5, 1950 |
| 2,542,887 | Watson | Feb. 20, 1951 |
| 2,583,110 | McLean | Jan. 22, 1952 |

FOREIGN PATENTS

| | | |
|---|---|---|
| 558,432 | Germany | Sept. 7, 1932 |